(12) United States Patent
Xu

(10) Patent No.: US 12,366,260 B1
(45) Date of Patent: Jul. 22, 2025

(54) FAST-DETACHING STRUCTURE

(71) Applicant: Shanghai Maodouya Automotive Electronics Co., Ltd., Shanghai (CN)

(72) Inventor: Hechuan Xu, Shanghai (CN)

(73) Assignee: Shanghai Maodouya Automotive Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/757,664

(22) Filed: Jun. 28, 2024

(30) Foreign Application Priority Data

Jan. 16, 2024 (CN) .......................... 202420107010.4

(51) Int. Cl.
*F16B 5/00* (2006.01)
*F16B 5/06* (2006.01)
*F16B 9/00* (2006.01)
*F16B 9/02* (2006.01)

(52) U.S. Cl.
CPC .......... *F16B 5/0016* (2013.01); *F16B 5/0664* (2013.01); *F16B 9/01* (2018.08); *F16B 9/02* (2013.01)

(58) Field of Classification Search
CPC .... F16B 5/0004; F16B 5/0008; F16B 5/0012; F16B 5/0016; F16B 5/0088; F16B 5/0092; F16B 5/02; F16B 5/0208; F16B 5/0642; F16B 5/0664; F16B 9/00; F16B 9/01; F16B 9/02; Y10T 403/59; Y10T 403/591; Y10T 403/60; Y10T 403/70; Y10T 403/7001; Y10T 403/7016; Y10T 403/7045; F16M 11/00; F16M 11/16
See application file for complete search history.

(56) References Cited

U.S. PATENT DOCUMENTS

| | | | | |
|---|---|---|---|---|
| 4,697,783 A * | 10/1987 | Kastendieck | .......... | A42B 3/042 403/321 |
| 5,332,183 A * | 7/1994 | Kagayama | ................. | B62J 6/03 248/223.41 |
| 5,484,223 A * | 1/1996 | Saito | ................... | H01R 13/4368 439/752 |
| 5,988,572 A * | 11/1999 | Chivallier | ........... | B60R 11/0241 248/176.1 |
| 6,811,348 B1 * | 11/2004 | Meyer | ...................... | A42B 3/04 403/324 |
| 7,011,285 B2 * | 3/2006 | Wang | ..................... | F16M 11/10 248/673 |

(Continued)

*Primary Examiner* — Josh Skroupa
*Assistant Examiner* — Kevin J Baynes

(57) ABSTRACT

A fast-detaching structure, includes a mounting member and a first connection member. The mounting member includes a bottom wall, two positioning walls, and two fixation edges. The bottom wall is connected to the two positioning walls. The bottom wall and the two positioning walls cooperatively define a mounting slot. The two fixation edges are arranged on top of the two positioning walls. The fixation edge extends towards an inside of the mounting slot. The bottom wall defines a snapping slot. The first connection member is detachably mounted in the mounting slot. The first connection member includes two abutting ends and a deforming end. The two abutting ends are arranged corresponding to the two positioning walls. The deforming end can be elastically deformed. A snapping tab is arranged on the deforming end and protruding towards the bottom wall.

19 Claims, 15 Drawing Sheets

(56) References Cited

U.S. PATENT DOCUMENTS

| | | | | |
|---|---|---|---|---|
| 7,300,297 B1* | 11/2007 | Wang | ...................... | H01R 27/00 |
| | | | | 439/173 |
| 7,481,403 B2* | 1/2009 | Yuan | .................... | F16M 11/041 |
| | | | | 403/321 |
| 8,267,614 B2* | 9/2012 | Khoe | .................... | F16B 5/0016 |
| | | | | 296/72 |
| 8,448,829 B2* | 5/2013 | Watanabe | ............ | H05K 5/0073 |
| | | | | 224/547 |
| 8,656,563 B2* | 2/2014 | Hiramatsu | ............ | F16B 37/043 |
| | | | | 52/716.5 |
| 8,939,674 B2* | 1/2015 | Zimmer | .............. | B29C 66/1282 |
| | | | | 403/14 |
| 10,638,622 B2* | 4/2020 | Kato | .................... | H05K 5/0017 |
| 11,754,218 B2* | 9/2023 | Cheung | ................. | F16M 13/02 |
| | | | | 248/274.1 |
| 11,933,349 B2* | 3/2024 | Fan | ...................... | F16B 5/0664 |
| 2012/0099850 A1* | 4/2012 | Onishi | .................... | B60R 11/04 |
| | | | | 396/419 |
| 2018/0187828 A1* | 7/2018 | Law | ...................... | F16M 11/125 |
| 2023/0324953 A1* | 10/2023 | Kim | ...................... | F16M 11/16 |

* cited by examiner

FAST-DETACHING STRUCTURE

CROSS REFERENCE TO RELATED APPLICATIONS

The present application claims priority of the Chinese patent application No. 202420107010.4, filed on Jan. 16, 2024, in the title of "FAST-DETACHING STRUCTURE", the contents of which are incorporated herein by its entireties.

TECHNICAL FIELD

The present disclosure relates to the field of detachable connection structures, and in particular to a fast-detaching structure.

BACKGROUND

In the art, when a large sized object is being stored or transported, components of the object need to be disassembled to reduce the size of the object. When the large sized object is to be used, the disassembled components are assembled to each other. In the above process, a detachable structure may be used to connect two components.

For detachable connection between a supported object and a supporting object, in order to ensure reliability of the support, the supported object and the supporting object are usually connected to each other by bolt fastening, threading, and so on. In this case, a tool may be needed when disassembling or connecting the two components, and therefore, the disassembling or connecting process may be performed difficultly, or it may take a long time to finish the disassembling or connecting process. Especially, for the supported object which needs to be frequently detached and replaced, it may be inconvenient to use the detachable structure in the art to connect the supported object.

SUMMARY OF THE DISCLOSURE

The present disclosure provides a fast-detaching structure, including the following. A mounting member is included and includes a bottom wall, two positioning walls, and two fixation edges; wherein, an angle is generated between the two positioning walls; the bottom wall is connected to the two positioning walls; the bottom wall and the two positioning walls cooperatively define a mounting slot; each of the two fixation edges is arranged on a top of a respective one of the two positioning walls; the fixation edge extends towards an inside of the mounting slot; the bottom wall defines at least one snapping slot. A first connection member is included and is detachably mounted in the mounting slot, wherein, the first connection member comprises two abutting ends and a deforming end; each of the two abutting ends is arranged corresponding to a respective one of the two positioning walls; the deforming end is connected to the two abutting ends; the deforming end is capable of being elastically deformed; at least one snapping tab is arranged on the deforming end and protruding towards the bottom wall; a drive portion is arranged on the deforming end and is configured to drive the deforming end to be elastically deformed. When the first connection member is to be mounted in the mounting slot, each of the two abutting ends abuts against a respective one of the two positioning walls, an upper part of each of the two abutting ends abuts against a lower part of a respective one of the two fixation edges, the deforming end abuts against the bottom wall and enables the snapping tab to extend to be snapped into the snapping slot.

The present disclosure further provides a fast-detaching structure, including the following. A mounting member is included and includes a bottom wall, a limiting wall, two positioning walls, and two fixation edges; wherein, the two positioning walls are substantially parallel to each other; the bottom wall is connected to the two positioning walls and intersects with the limiting wall; the bottom wall, the limiting wall, and the two positioning walls cooperatively define a mounting slot; each of the two fixation edges is arranged on a top of a respective one of the two positioning walls; the fixation edge extends towards an inside of the mounting slot; the bottom wall defines at least one snapping slot. A first connection member is included and is detachably mounted in the mounting slot, wherein, the first connection member comprises a front abutting end, two abutting ends, and a deforming end; the front abutting end is disposed corresponding to the limiting wall; each of the two abutting ends is arranged corresponding to a respective one of the two positioning walls; the deforming end is opposite to the front abutting end; the deforming end and the front abutting end are both connected to the two abutting ends; the deforming end is capable of being elastically deformed; at least one snapping tab is arranged on the deforming end and protruding towards the bottom wall; a drive portion is arranged on the deforming end and is configured to drive the deforming end to be elastically deformed. When the first connection member is to be mounted in the mounting slot, the front abutting end abuts against the limiting wall, each of the two abutting ends abuts against a respective one of the two positioning walls, each of the two abutting ends abuts against a respective one of the two fixation edges, the deforming end abuts against the bottom wall and enables the snapping tab to extend to be snapped into the snapping slot.

BRIEF DESCRIPTION OF THE DRAWINGS

In order to more clearly illustrate technical solutions in the embodiments of the present disclosure or in the art, the accompanying drawings for describing the embodiments of the present disclosure or in the art will be briefly introduced in the following. Obviously, the following description of the accompanying drawings shows only some of the embodiments of the present disclosure, and any ordinary skilled person in the art may obtain other accompanying drawings according to the following drawings without making creative work.

REFERENCE NUMERALS

Figure 1:
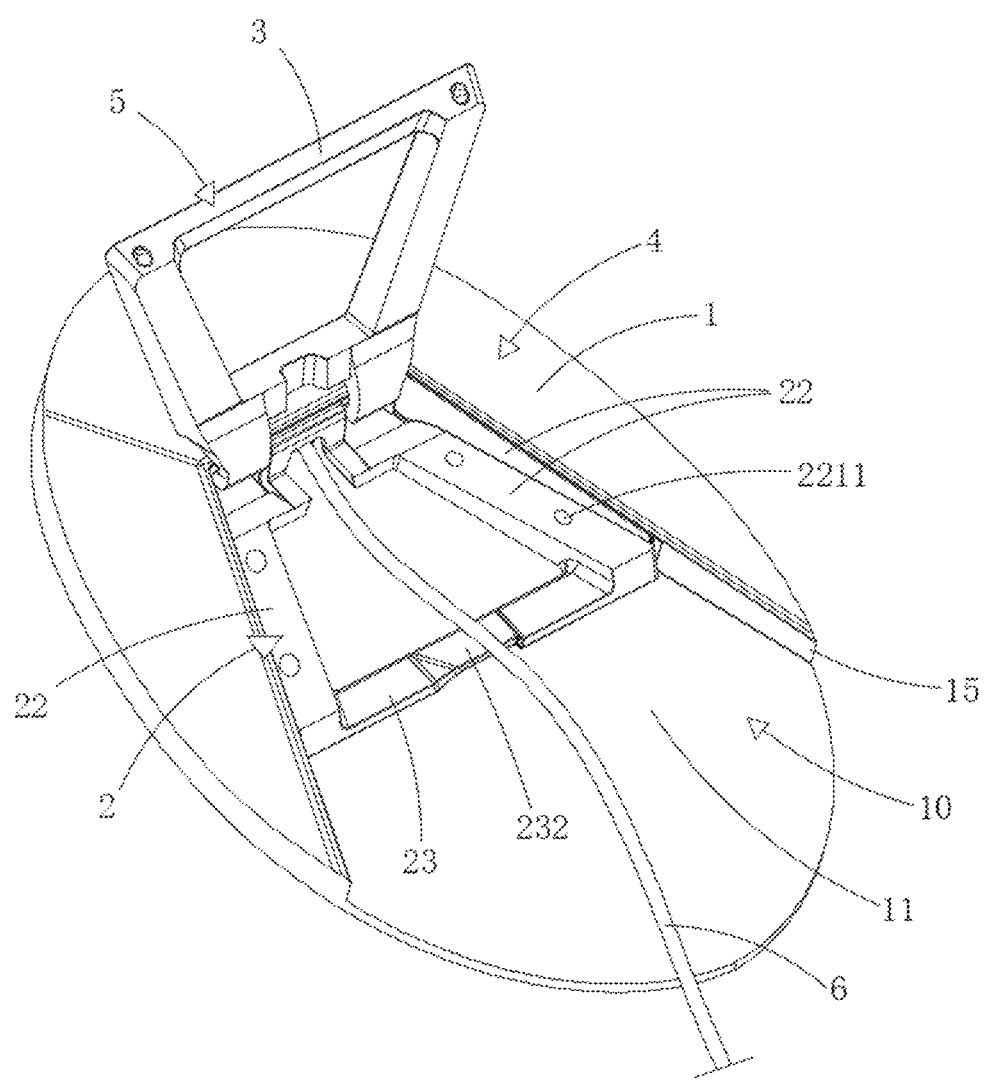
FIG. 1 is a perspective view of arranging a mounting member on a supported object, according to an embodiment of the present disclosure.

Mounting member 1, mounting slot 10, bottom wall 11, positioning wall 12, fixation edge 13, limiting wall 14, notch 15, slot 110, connection post 141, wire channel 1411, bottom surface of the fixation edge 1301, side of the fixation edge near the positioning wall 13011, side of the fixation edge away from the positioning wall 13012;

First connection member 2, front abutting end 21, abutting end 22, deforming end 23, receiving port 211, shaft hole 212, lifting rod 221, abutting edge 222, snapping tab 231, drive portion 232, fixation plate 233, deforming plate 234, top surface of the front abutting end 2101, top portion of the abutting end 2201, bolt hole 2211, top surface of the abutting edge 2221, bottom surface of the deforming end 2301, fastening slot 2331, reinforcement portion 2332, reinforcement rib 2333, fastening tab 2341;

Second connection member 3, first connection portion 31, second connection portion 32, and rotation shaft 311;

Supported object 4;

supporting object 5;

Conducting wire 6;

Fastening member 7;

Avoidance space 100, shielding space 101.

DETAILED DESCRIPTION

Unless otherwise defined, all technical and scientific terms used herein have the same meaning as commonly understood by any ordinary skilled person in the art. The terms used herein in the specification of the application are used only for the purpose of describing specific embodiments and do not limit the scope of the present disclosure. The terms "include", "comprise", and any variation thereof used in the specification, the claims, the drawings of the present disclosure are intended to cover non-exclusive inclusion. The terms "first", "second", and so on, in the specification, claims, and drawings of the present disclosure are used to distinguish different objects and are not intended to describe a particular order.

Reference to "embodiments" herein implies that particular features, structures, or properties described in an embodiment may be included in at least one embodiment of the present disclosure. The presence of the term at various sections in the specification does not necessarily refer to a same embodiment, nor a separate or an alternative embodiment that is mutually exclusive of other embodiments. Any ordinary skilled person in the art shall understand, both explicitly and implicitly, that the embodiments described herein may be combined with other embodiments.

In order to enable any ordinary skilled person in the art to better understand the embodiments of the present disclosure, the technical solutions in the embodiments of the present disclosure will be clearly and completely described below by referring to the accompanying drawings.

Figure 17:
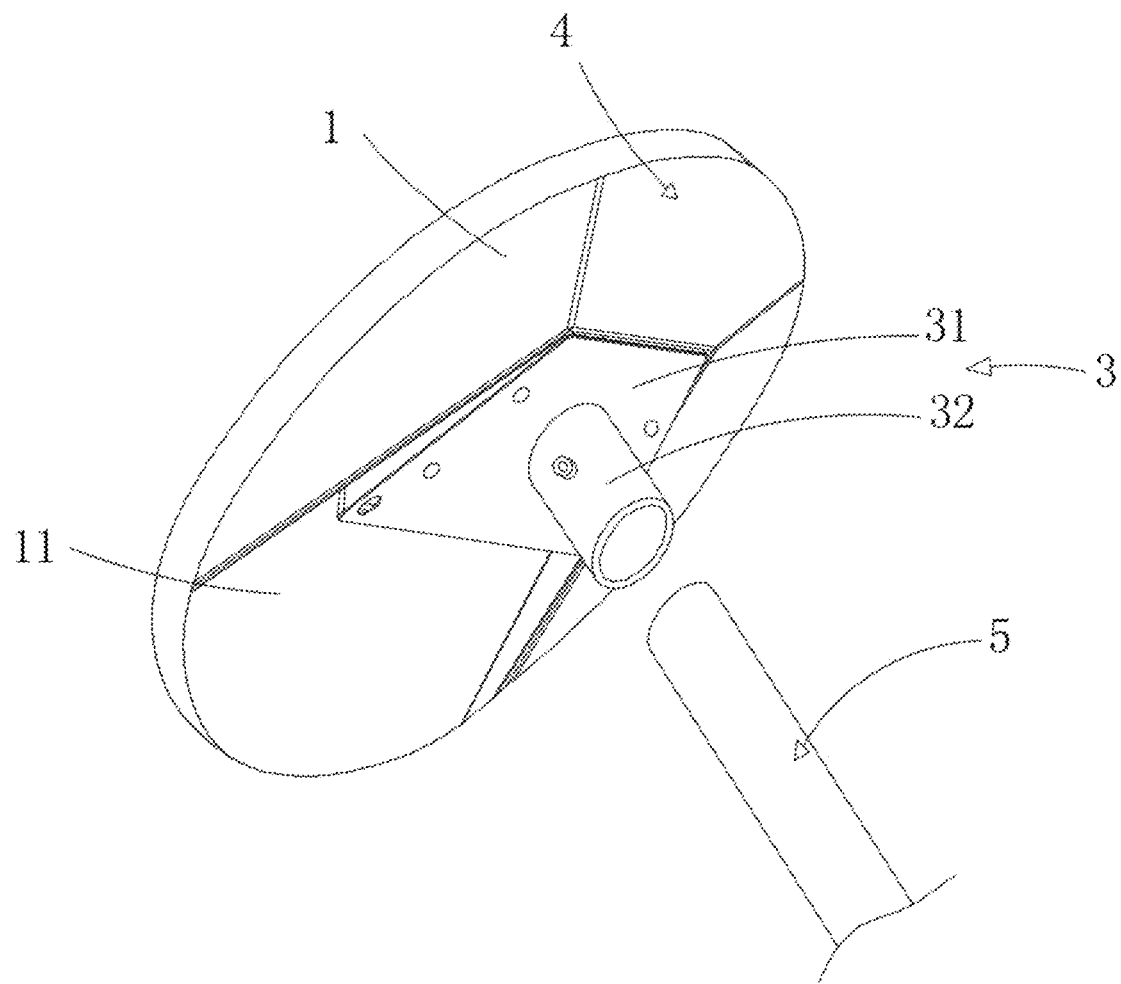
FIG. 17 is a structural schematic view of the connection structure of the first connection member and the second connection member according to a second embodiment of the present disclosure.

As shown in FIGS. 1 to 17, the present disclosure provides a fast-detaching structure including a mounting member 1 and a first connection member 2. The mounting member 1 may be integrally formed on a supported object 4, as shown in the FIG. 1. The mounting member 1 may alternatively be a separate structure and configured to be mounted to the supported object 4, as shown in FIG. 15. The first connection member 2 is configured to be connected to a supporting member 5 or to a second connection member 3 arranged on the supporting member, as shown in FIG. 17.

Figure 4:
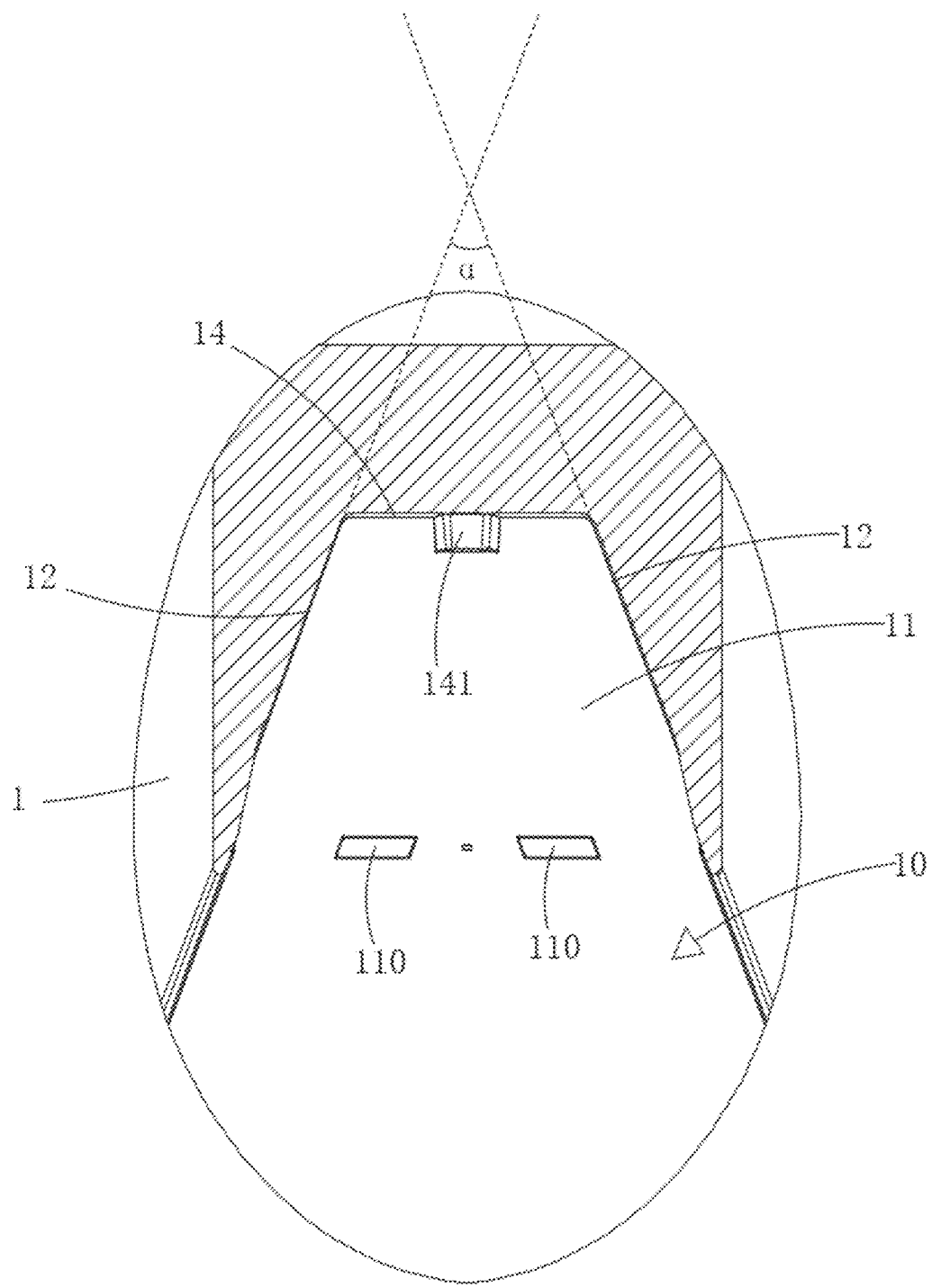
FIG. 4 is a structural schematic view of extending planes of two positioning walls intersecting with each other according to an embodiment of the present disclosure.

Specifically, in the present embodiment, the mounting member 1 includes a bottom wall 11, two positioning walls 12, and two fixation edges 13. An angle is generated between the two positioning walls 12, such as an angle α as shown in FIG. 4. The bottom wall 11 is connected to the two positioning walls 12 and defines a slot 110. The fixation edges 13 are arranged on top edges of the positioning walls 12 away from the bottom wall 11 and extend towards an interior of a mounting slot 10.

The first connection member 2 is detachably mounted in the mounting slot 10. Specifically, the first connection member 2 is fixedly mounted in the mounting slot 10 by in a snapping manner. The first connection member 2 includes two abutting ends 22 and a deforming end 23. The two abutting ends 22 are arranged corresponding to the two positioning walls 12. The two abutting ends 22 are symmetrical to each other. The deforming end 23 is connected between the two abutting ends 22. The deforming end 23 can be elastically deformed. A snapping tab 231 is arranged on the deforming end 23 and protruding towards the bottom wall 11. A drive portion 232 is arranged on the deforming end 23. The drive portion 232 may drive the deforming end 23 to be elastically deformed upwardly.

When the first connection member 2 is to be mounted to the mounting member 1, the first connection member 2 may be received in the mounting slot 10 and may be pushed towards an intersection of the two positioning walls 12 or an intersection of extending surfaces of the two positioning walls 12, until the snapping tab 231 is snapped into the slot 110 after the two abutting ends 22 respectively abut against the two positioning walls 12, such that snapping connection is achieved. Furthermore, the two abutting ends 22 further respectively abut against the two fixation edges 13, and the deforming end 23 abuts against the bottom wall 11. When the two abutting ends 22 respectively abut against the two positioning walls 12, the two positioning walls 12 are configured to restrict the first connection member 2 from continuing to slide forwardly and to restrict the first connection member 2 from sliding to a left or backwardly. The snapping tab 231 is snapped with the slot 110 to restrict the first connection member 2 from moving backwardly. The two fixation edges 13 and the bottom wall 11 are engaged to each other to cooperatively restrict the first connection member 2 from moving vertically, preventing the first connection member 2 from being detached from the mounting slot 10 upwardly. Therefore, when the snapping tab 231 is snapped into the slot 110, the first connection member 2 is prevented from moving in six directions, i.e., forward, backward, leftward, rightward, upwardly and downwardly, such that the first connection member 2 is completely fixed. In this way, when the supporting member 5 is loaded on the first connection member 2, the mounting member 1 or the supported object 4 arranged on the mounting member 1 are supported.

Figure 7:
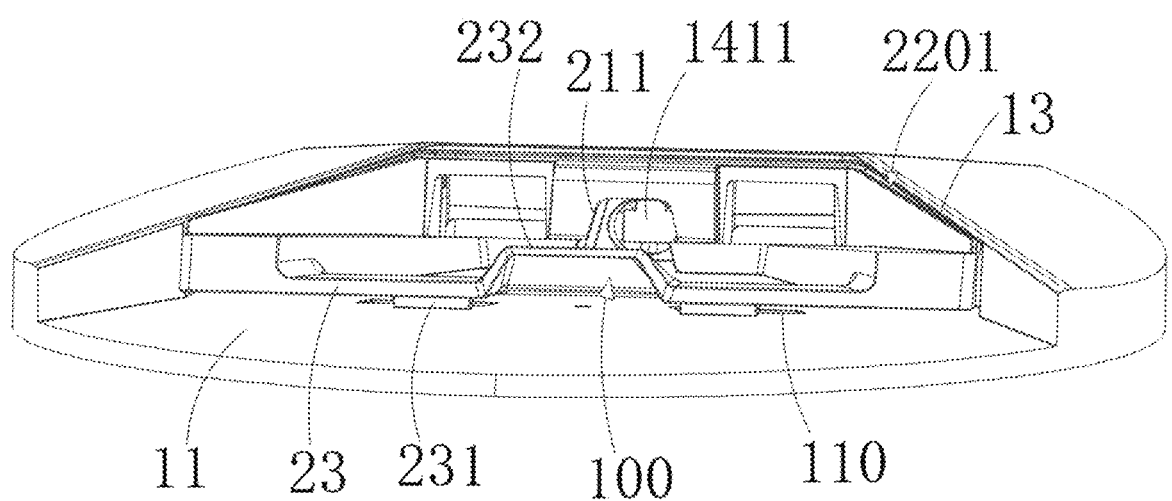
FIG. 7 is a structural schematic view of a snapping tab abutting against a bottom of the mounting slot, causing a deforming end to be lifted up, according to an embodiment of the present disclosure.

The snapping tab 231 is protrudingly arranged on a bottom surface 2301 of the deforming end 23. Therefore, in a process of the first connection member 2 being sliding, when the snapping tab 231 has not yet moved to a position where the snapping slot 110 is located, the snapping tab 231 slides while abutting against the bottom wall 11. In this way, the deforming end 23 may be curled up, and accordingly, a top 2201 of the abutting end 22 is not aligned with the fixation edge 13, as shown in FIG. 7. When the top 2201 of the abutting end 22 contacts the fixation edge 13 and continues to slide, the fixation edge 13 applies a downward pressure on the abutting end 22, and the bottom wall 11 applies an upward pressure on the snapping tab 231, such that the deforming end 23 is elastically deformed. When the snapping tab 231 moves to reach a location above the slot 110, the elastically deformed deforming end 23 is restored, driving the snapping tab 231 to extend into the slot 110, such that the snapping tab 231 is snapped with the slot 110.

When the first connection member 2 needs to be removed from the mounting member 1, a user may lift the drive portion 232 to cause the deforming end 23 to be elastically deformed upwardly, and the snapping tab 231 is then lifted up and disengaged from the slot 110. In this way, restriction on the backward movement of the first connection member 2 is released. The user may pull and slide the first connection member 2 along the mounting slot 10, enabling the first connection member 2 to be disengage from the fixation edge 13.

Therefore, the connecting and detaching process of the fast-detaching structure is achieved quickly, and the connection structure is reliable and stable. The user is facilitated to quickly mount the supported object 4 onto the supporting object 5. The disassembling and mounting process between the mounting member 1 and the first connection member 2 does not require any tool to be used. The supported object 4, which needs to be disassembled frequently, may be re-mounted conveniently and quickly.

Specifically, considering durability of the connection structure, the first connection member 2 may be made of metal, such as aluminum alloy, iron, and so on. Alternatively, in order to reduce difficulty for the user to lift the drive portion 232, the first connection member 2 may be made of plastic. Further, in order to enable the user to lift the drive portion 232, in the present embodiment, the drive portion 232 is arc-shaped. An avoidance space 100 is formed between the drive portion 232 and the bottom wall 11. The user may place a finger into the avoidance space 100 to easily apply a force to lift the drive portion 232.

Figure 3:
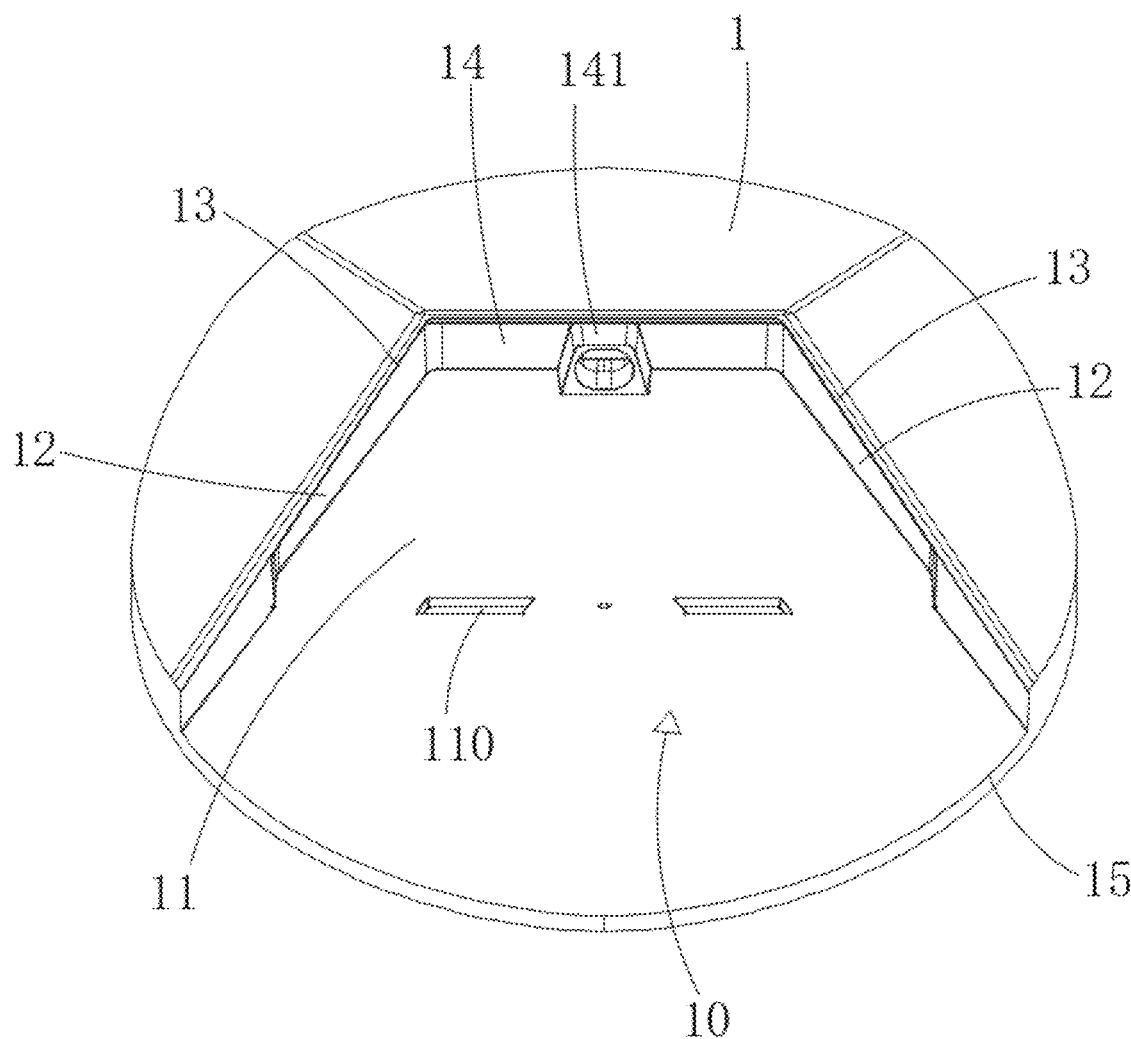
FIG. 3 is a structural schematic view of a mounting slot according to an embodiment of the present disclosure.

Further, as shown in FIG. 3, the first connection member 2 further includes a front abutting end 21 disposed opposite to the deforming end 23. The front abutting end 21 is also connected between the two abutting ends 22. The mounting member 1 is arranged with a limiting wall 14 at the intersection of the two positioning walls 12. When the two abutting ends 22 respectively abut against the two positioning walls 12, the front abutting end 21 abuts against the limiting wall 14. In the present embodiment, the limiting wall 14 is configured to limit the first connection member 2 from moving forwardly.

Further, the first connection member 2 is ring-shaped in overall, the deforming end 23 is configured as flattened plate, such that it is less difficult to apply the force to drive the deforming end 23 to be elastically deformed. Specifically, in the present embodiment, the ring-shaped first connection member is formed by the front abutting end 21, the two abutting ends 22 and the deforming end 23 being connected to each other.

In addition, the two fixation edges 13 extend to the top of the limiting wall 14 and are connected to each other, such that the top surface 2101 of the front abutting end 21 abuts against the fixation edges 13. In this way, a contact area between the first connection member 2 and the fixation edges 13 is increased, and stability of the connection between the first connection member 2 and the mounting member 1 is improved.

Figure 9:
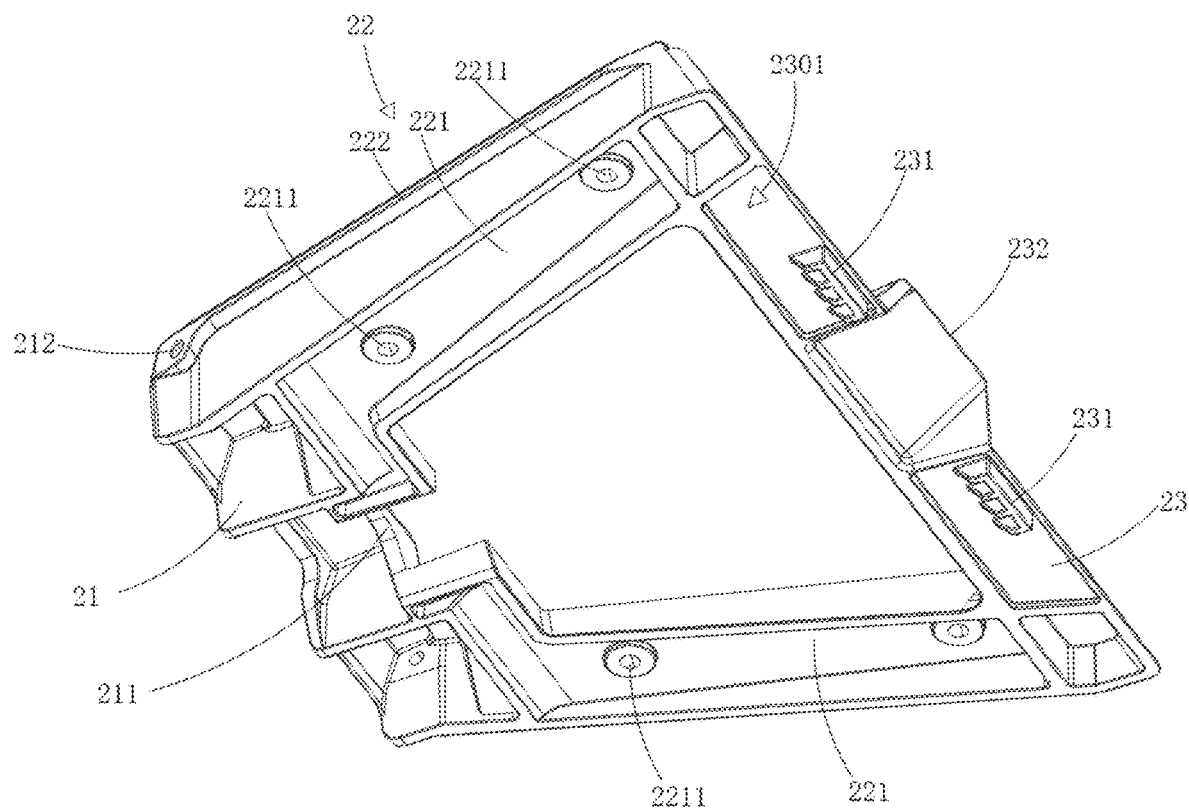
FIG. 9 is a structural schematic view of a bottom of the first connection member according to an embodiment of the present disclosure.
Figure 10:
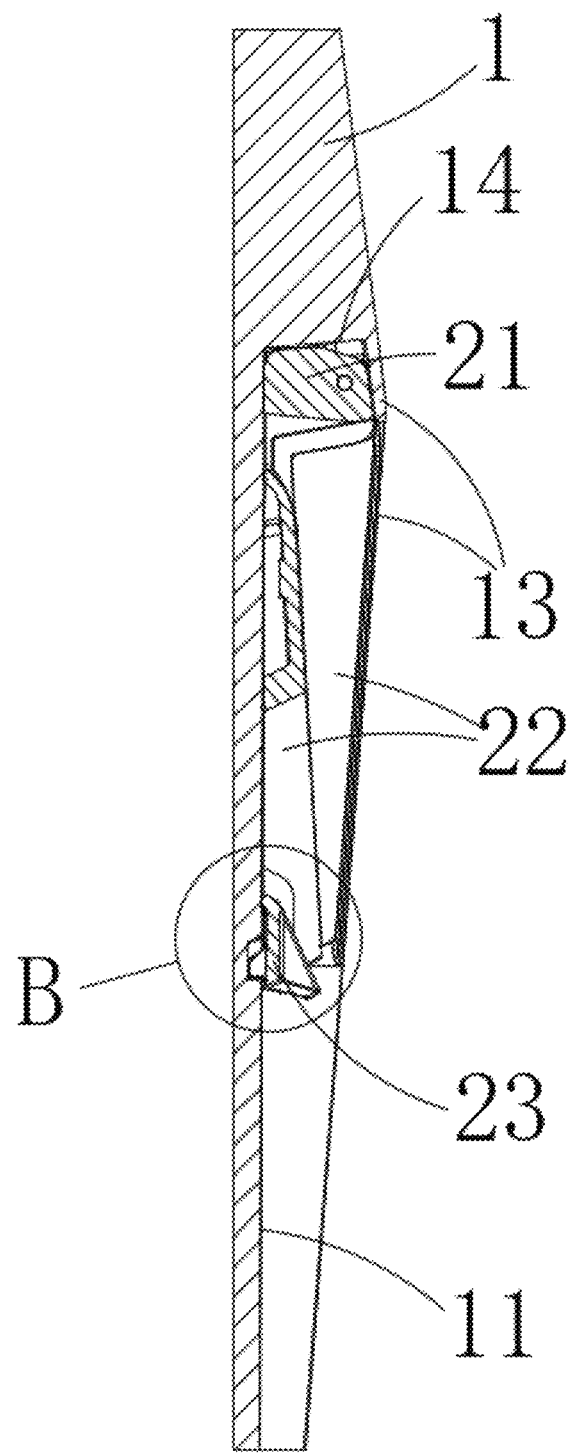
FIG. 10 is another cross-sectional view of an embodiment of the present disclosure.
Figure 11:
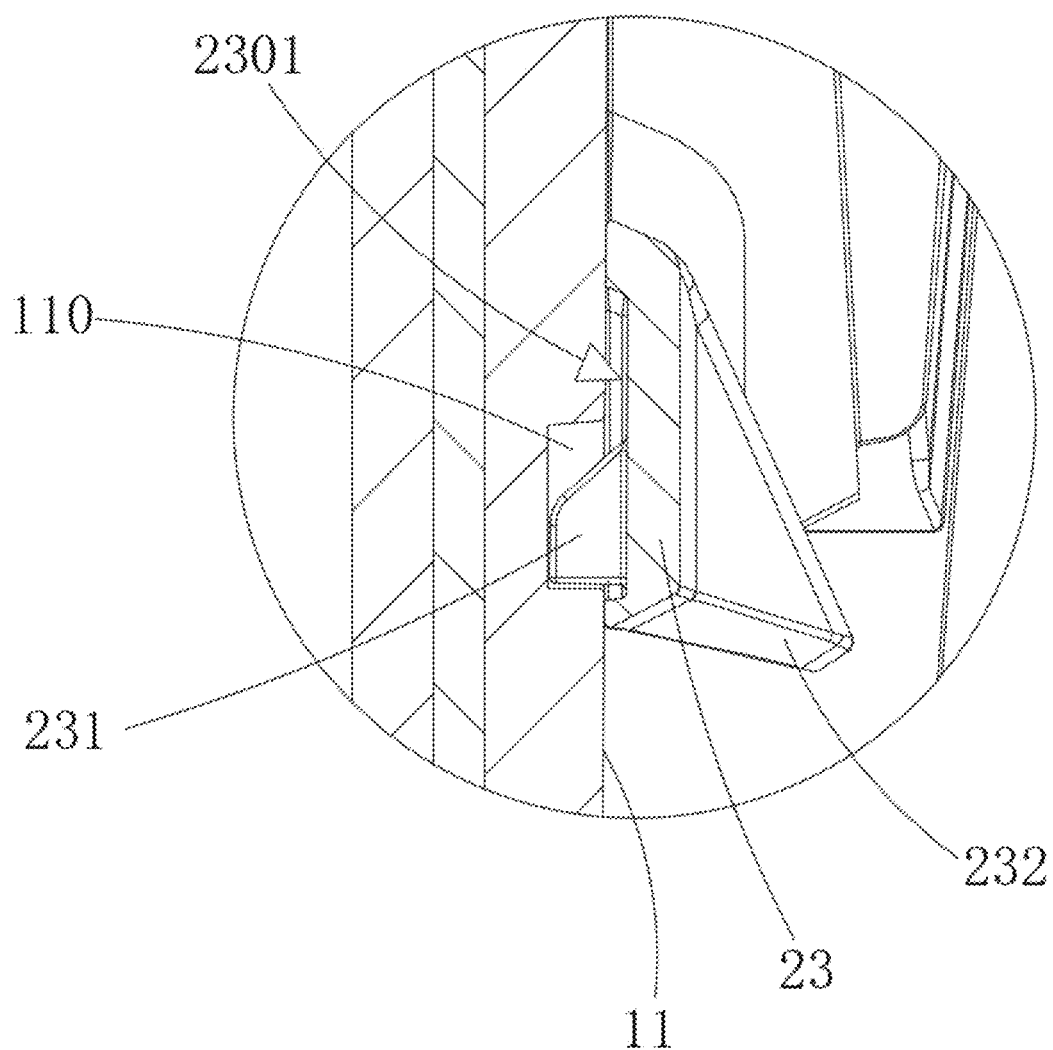
FIG. 11 is an enlarged view of a portion B of FIG. 9.

Further, in order to improve strength of the snapping connection between the snapping tab 231 and the slot 13, in the present embodiment, as shown in FIG. 9, the deforming end 23 is arranged with two snapping tabs 231. The two snapping tabs 231 are disposed in a mirror symmetrical manner with respect to each other, taking the drive portion 232 as a symmetrical center. The bottom wall 11 correspondingly defines two snapping slots 110. The two snapping tabs 231 are respectively snapped with the two snapping slots 110. By increasing the number of snapping tabs 231, strength of the snapping connection between the first connection member 2 and the mounting member 1 is improved. Since the two snapping tabs 231 are disposed on two sides of the drive portion 232, when the drive portion 232 is lifted, the two snapping tabs 231 are driven to be released out of the snapping slots 110 at the same time.

Figure 6:
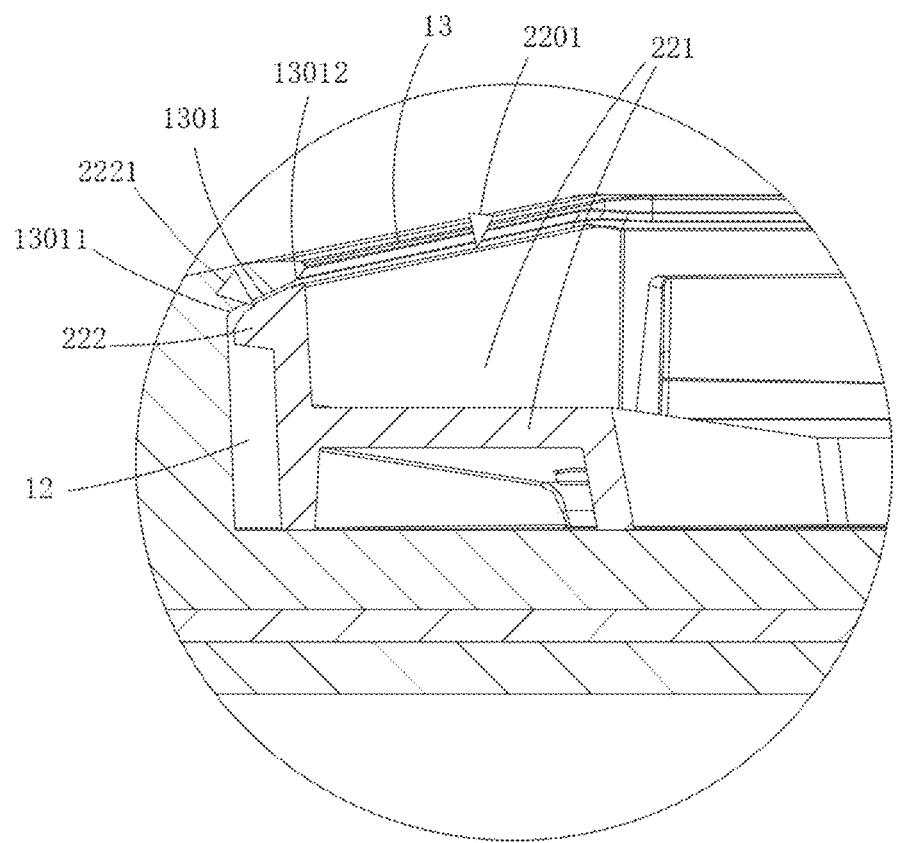
FIG. 6 is an enlarged view of a portion A of FIG. 5.

According to the principle of force interaction, when the fixation edge 13 applies the pressure to the top 2201 of the abutting end 22, the fixation edge 13 also receives a reaction force applied by the top 2201 of the abutting end 22. Therefore, the fixation edge 13 and the top 2201 of the abutting end 22 are inevitably elastically deformed to a certain extent. When a thickness of a portion of the abutting end 22 that abuts against the fixation edge 13 is excessively thick, deformation caused when the abutting end 22 that abuts against the fixation edge 13 may be concentrated on the fixation edge 13. When the fixation edge 13 is deformed to a large extent for a plurality of times, the fixation edge 13 may be malfunctioned. In the present embodiment, in order to reduce a deformation amount of the fixation edge 13, the abutting end 22 is made to include a lifting rod 221 and an abutting edge 222. The front abutting end 21 and the deforming end 23 are both connected to two lifting rods 221. The abutting edge 222 is arranged at a top of each lifting rod 221 and is extending toward the positioning wall 12. A thickness of the abutting edge 222 is less than a thickness of the lifting rod 221. Therefore, in the present embodiment, two abutting edges 222 are arranged to abut against the two positioning walls 12. When the two abutting edges 222 respectively abut against the two positioning walls 12, the two abutting edges 222 further respectively abut against the two fixation edges 13. In the present embodiment, A top surface 2221 of the abutting edge is also the above-mentioned top 2201 of the abutting end, as shown in FIG. 6. Therefore, in the present embodiment, the thickness of the top 2201 of the abutting end 22 is reduced to form the abutting edge 222. When the first connection member 2 is sliding to be mounted, the fixation edges 13 interact with the abutting edges 222. The thickness of the abutting edge 222 is comparable to the thickness of the fixation edge 13. Therefore, the deformation generated when the abutting edge 222 abuts against the fixation edge 13 is equally distributed to the abutting edge 222 and the fixation edge 13, such that the deformation amount of the fixation edge 13 is reduced.

In addition, when the first connection member 2 is to be detached from the mounting member 1, the user only needs to drive the flattened deforming end 23 to be elastically deformed upwardly. The force that the user needs to apply on the drive portion 232 is reduced. In addition, in the process of the deforming end 23 being deformed, the deforming end 23 itself has an elastic force that tends to be restored to its original state, the two lifting rods 221 also generate a pulling force on the deforming end 23. When the snapping tab 231 is moved to the top of the slot 110, the pulling force that the lifting rods 221 apply on the deforming end 23 is mainly used to straighten the deforming end 23, i.e., the pulling force drives the deforming end 23 to be restored to a flattened state, and the snapping tab 231 is pressed into the slot 110 accordingly.

Figure 12:
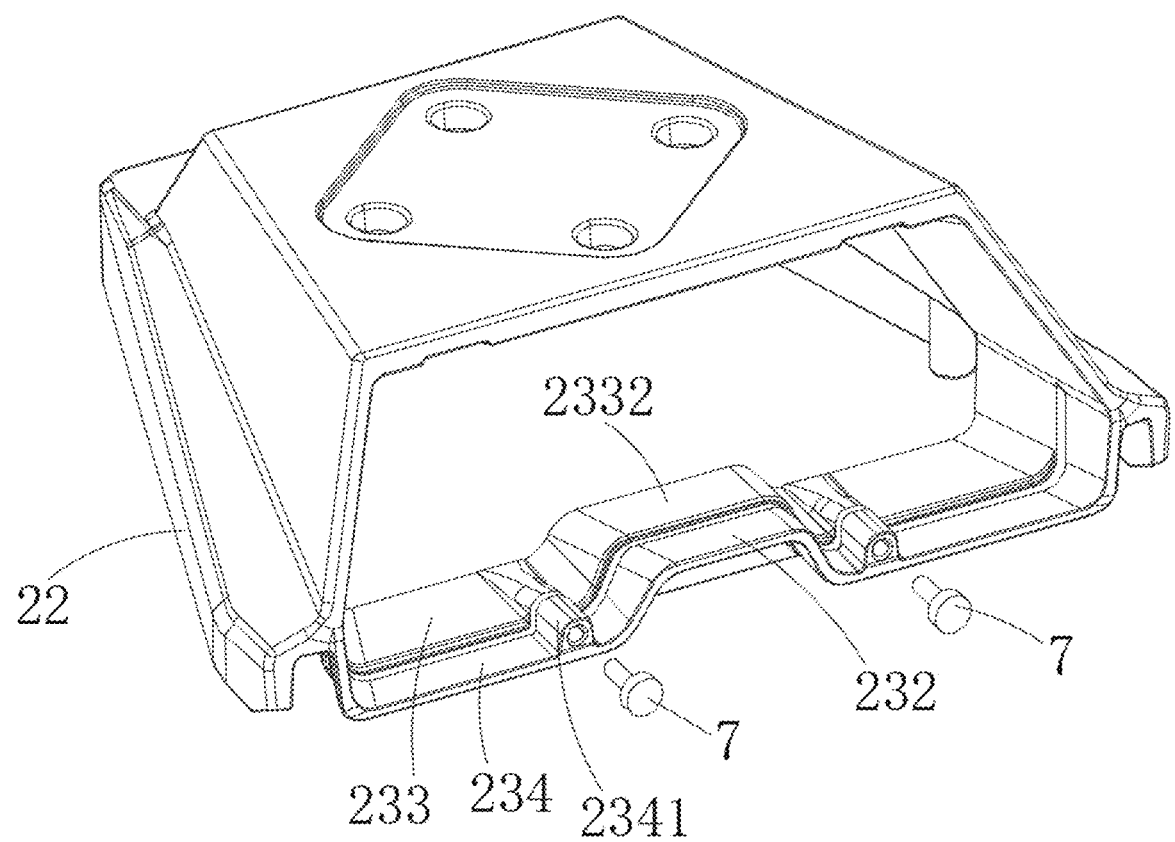
FIG. 12 is a structural schematic view I of the deforming end according to another embodiment of the present disclosure.
Figure 13:
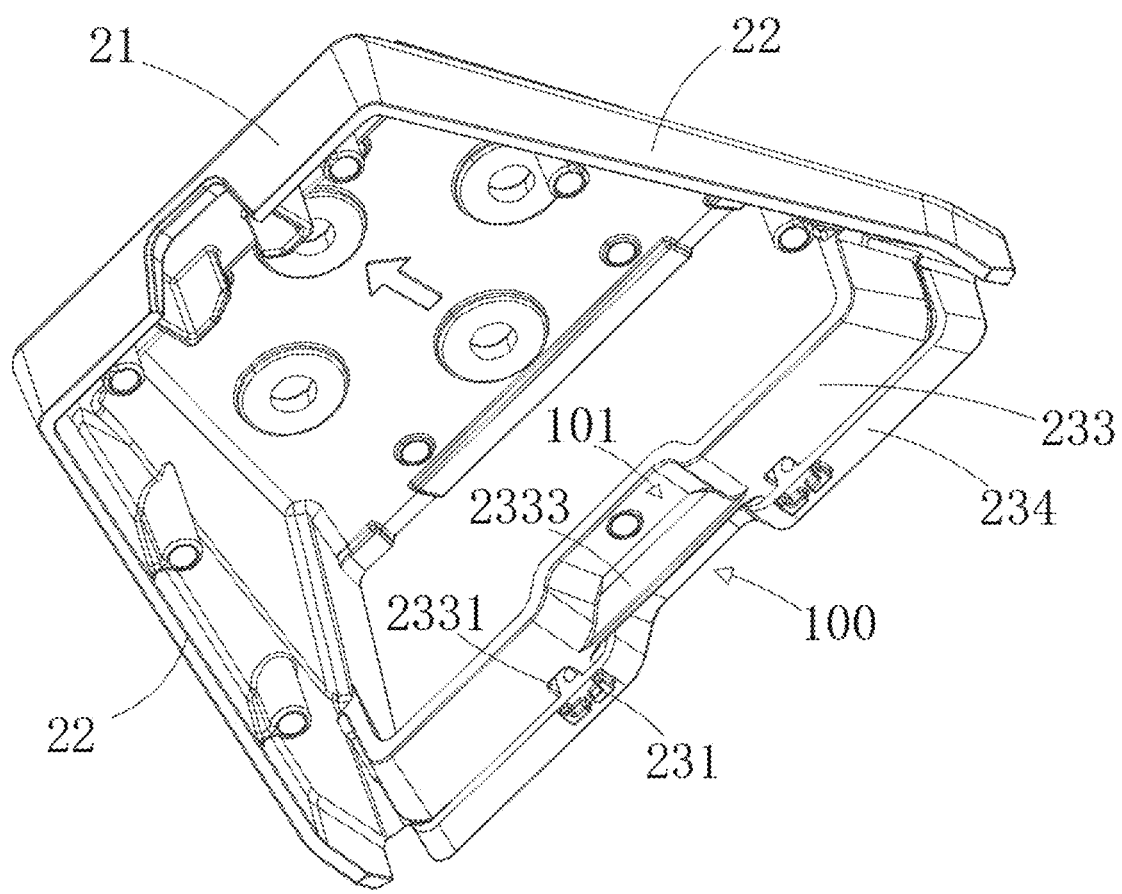
FIG. 13 is a structural schematic view II of the deforming end according to another embodiment of the present disclosure.
Figure 14:
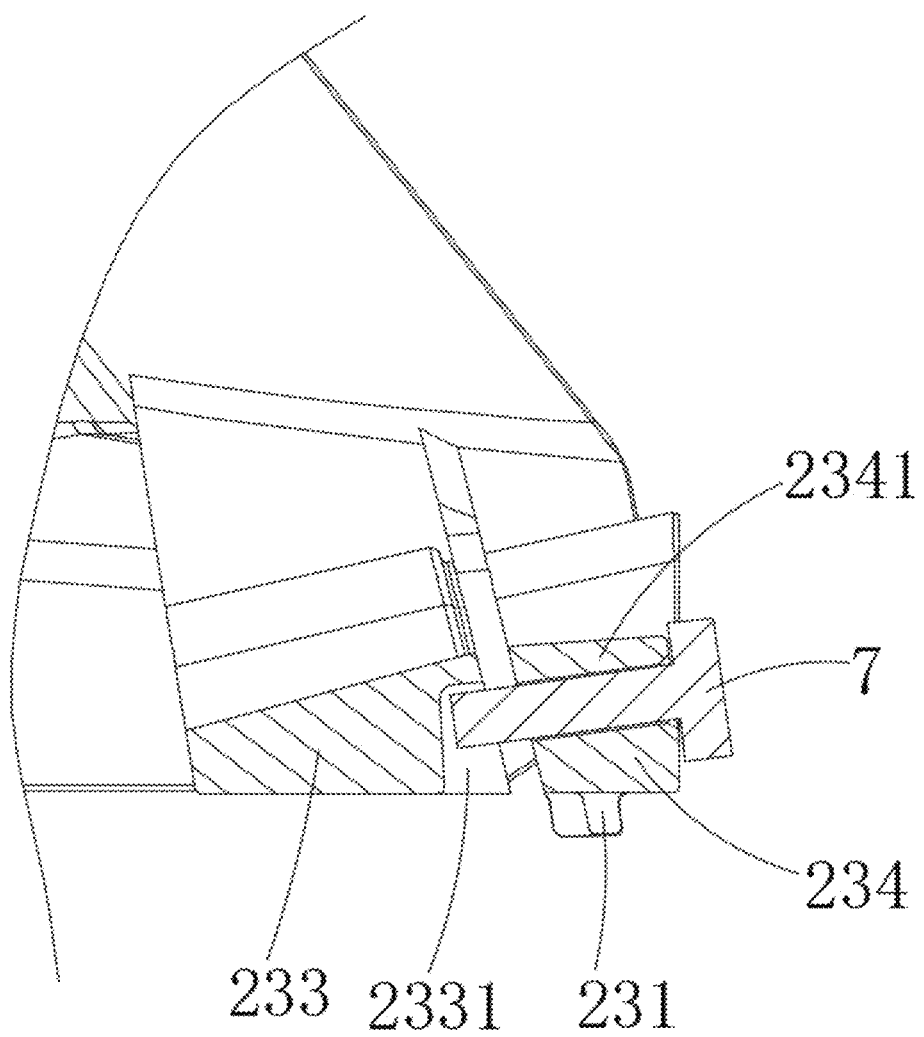
FIG. 14 is a cross-sectional view of the deforming end according to another embodiment of the present disclosure.
Figure 15:
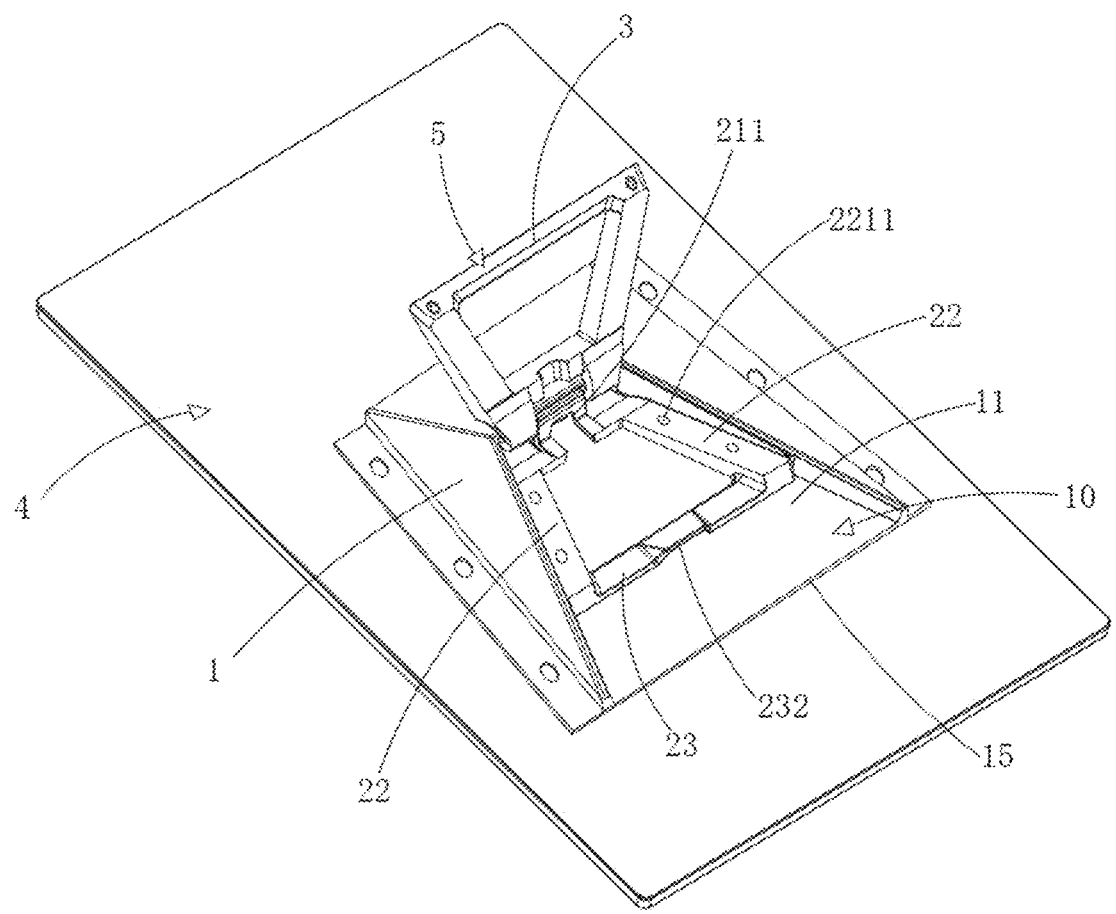
FIG. 15 is a structural schematic view showing the mounting member being mounted on the supported object and a hinge connection between the second connection member and the first connection member, according to another embodiment of the present disclosure.
Figure 16:
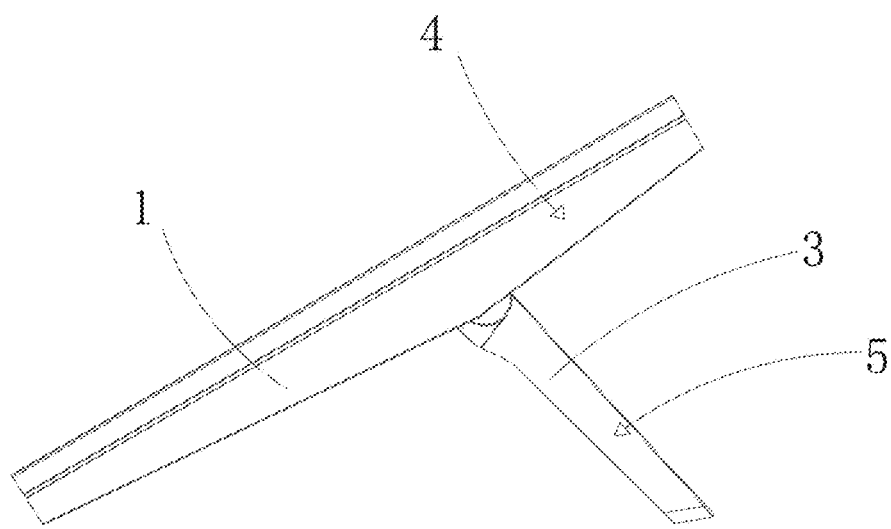
FIG. 16 is a structural schematic view of the connection structure of the first connection member and the second connection member according to a first embodiment of the present disclosure.

In other embodiments, as shown in FIGS. 12, 13, and 14, the deforming end includes a fixation plate 233 and a deforming plate 234 that are disposed side by side to each other. Both the fixation plate 233 and the deforming plate 234 are connected to the abutting end 22, such that enabling the fixation plate 233 to be deformed is more difficult than enabling the deforming plate 234 to be deformed. The fixation plate 233 defines a fastening slot 2331. A depth of the fastening slot 2331 extends along an arrangement direction of the fixation plate 233 and the deforming plate 234. The snapping tab 231 is disposed at a bottom of the deforming plate 233, and the drive portion 232 is disposed at a top surface of the deforming plate 234. The top surface of the deforming plate 234 is further arranged with a fastening tab 2341 at a position corresponding to the snapping tab 231. The snapping tab 2341 is disposed near the drive portion 232. The snapping tab 2341 is located at a position corresponding to the fastening slot 2331. The fast-detaching structure further includes a fastening member 7. The fastening member 7 extends through the fastening tab 2341 to enable the fastening member 7 to extend into the fastening slot 2331. Specifically, when in use, the fastening member 7 is configured as a bolt-type structure. The fastening member 7 is mounted to the fastening tab 2341 by threading. The fastening member 7 is screwed to be fastened, such that the fastening member 7 is driven to be inserted into the fastening slot 2331. When the user lifts the drive portion upwardly, the fastening member correspondingly abuts against the fixation plate, preventing the snapping tab from continuing to move upwardly to be disengaged from the slot, and improving the difficulty in deforming the deforming plate 234. Therefore, when the structure is being in use, a possibility that the snapping tab 231 is naturally disengaged from the slot 110 due to vibration, shaking, or the like can be reduced. Similarly, after driving the fastening member 7 to be disengaged out of the fastening slot 2331, restriction applied by the fixation plate 233 on the deforming plate 234 is released. When the user lifts the drive portion 232, it is easier to drive the deforming plate 234 to be deformed upwardly. As shown in the FIG. 12, in the present embodiment, the first connection member 2 defines a bolt hole, such that the first connection member 2 is configured to connect with the supporting object 5.

In the present embodiment, the fixation plate 233 and the deforming plate 234 are made of a same material. The thickness of the fixation plate 233 is greater than the thickness of the deforming plate 234, so as to improve difficulty of deforming the fixation plate 233. Alternatively, in other embodiment, the fixation plate 233 is made of a more rigid material, such as aluminum alloy; and the deforming plate 234 is made of a softer material, such as plastic. In this way, the difficulty in deforming the fixation plate 233 is improved. In addition, the fixation plate 233 is arranged with a protruding reinforcement portion 2332 at a position corresponding to the drive portion 232. A shape of the reinforcement portion 2332 is similar to that of the drive portion 232. A shielding space 101 is formed between the reinforcement portion 2332 and the bottom wall 11. The reinforcement portion 2332 is arranged with a reinforcement rib 2333 inside the shielding space 101. The reinforcement rib 2333 extends along a length of the fixation plate 233. The reinforcement rib 2333 is substantially configured to improve structural rigidity of the fixation plate 233, i.e., configured to increase the difficulty of deforming the fixation plate 233 upwardly.

Further, in an embodiment, as shown in FIG. 6, a bottom surface 1301 of the fixation edge 13 is inclined. A height of a side 13011 of the bottom surface 1301 of the fixation edge 13 near the positioning wall 12 is lower, and a height of a side 13012 of the bottom surface 1301 of the fixation edge 13 away from the positioning wall 12 is higher. Furthermore, a top surface 2221 of the abutting edge 222 is configured to extend following the inclination of the fixation edge 13. During a process of sliding the first connection member 2 into the mounting slot 10, the abutting edge 222 interacts with the fixation edge 13, and at this time, the bottom surface 1301 of the fixation edge 13 is configured to be inclined to guide the abutting edge 222 to approach the positioning wall 12. In addition, the contact area between the abutting edge 222 and the fixation edge 13 is increased, a possibility of having a point contact therebetween is reduced. In this way, a force area between the abutting edge 222 and the fixation edge 13 is increased, preventing the fixation edge 13 or the abutting edge 222 from being broken due to an excessive localized force.

Further, in the present embodiment, in a case that the supported object 4 needs to be connected to a power source, a structure equivalent to the mounting member 1 is formed on the supported object 4. The limiting wall 14 thereof is arranged with a connection post 141 protruding toward the interior of the mounting slot 10. The connection post 141 defines a wire channel 1411 extending inside the connection post 141, and the front abutting end 21 defines a receiving port 211 correspondingly. After the first connection member 2 is mounted on the mounting member 1, the connection post 141 passes through the receiving port 211, a wire 6 passes through the receiving port 211 and the wire channel 1411 to further extend to an interior of the supported object 4 to achieve electrical connection. In addition, since the front abutting end 21 itself has a thickness, the protruding connection post 141 prevents the front abutting end 21 from blocking the wire channel 1411. In this way, the wire channel 1411 is enabled to extend towards the interior of the mounting slot 10, facilitating the user to arrange the wire 6.

Figure 2:
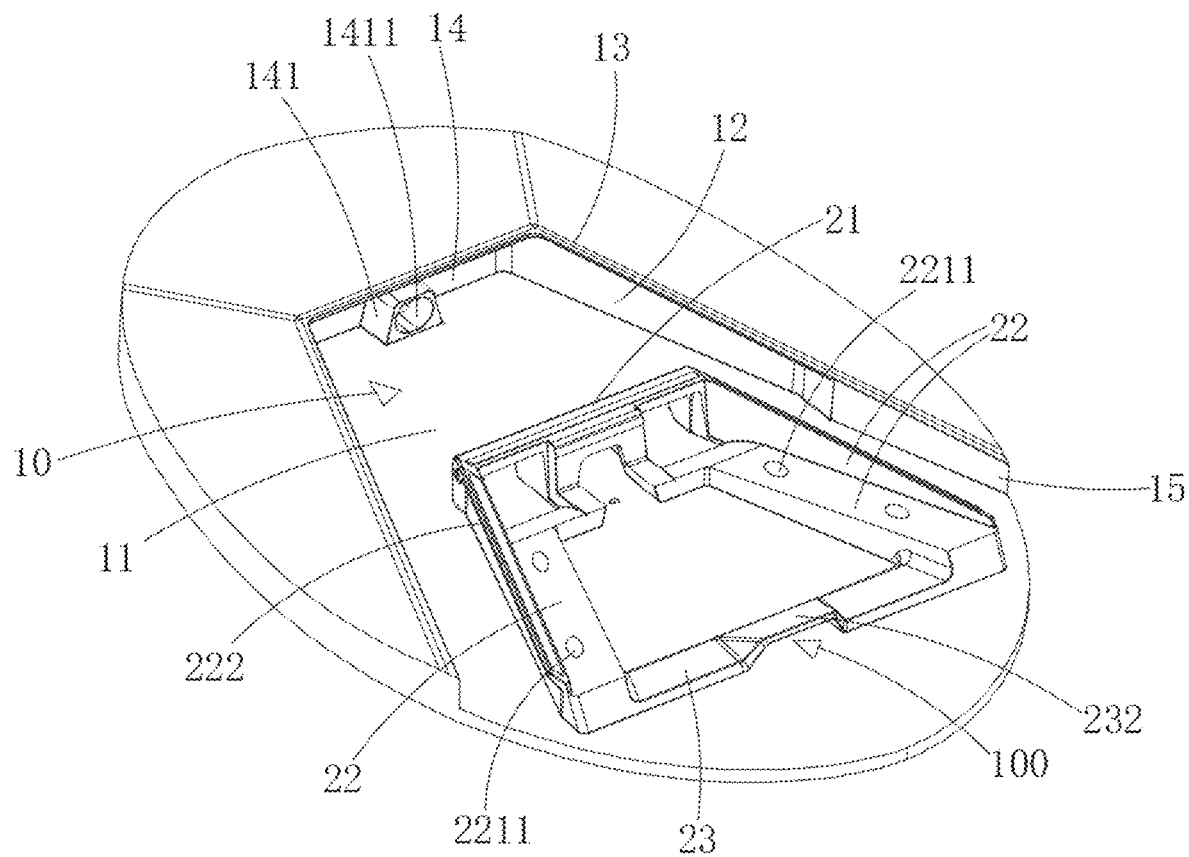
FIG. 2 is a structural schematic view of slidable connection structure between the mounting member and a first connection member, according to an embodiment of the present disclosure.

Further, in order to facilitate the user to quickly mount the first connection member 2 into the mounting slot 10, in the present embodiment, a side of the mounting slot 10 away from the limiting wall 14 extends through the mounting member 1, and a notch 15 is formed in a side wall of the mounting member 1, as shown in FIGS. 1 and 2. The user may slide the first connection member 2 into the mounting slot 10 through the notch 15.

In the present embodiment, the fast-detaching structure further includes the second connection member 3 that is substantially configured to be connected with the supporting object 5. The second connection member 3 is mounted on a side of the first connection member 2 away from the mounting member 1. The second connection member 3 and the first connection member 2 are made of a same material. The first connection member 2 is served as an adapter, and the second connection member 3 is configured for supporting or configured to be connected with the supporting object 5. Therefore, when the manufacturer is producing the fast-detaching structure or a product arranged with the fast-detaching structure, second connection members 3 in a plurality of forms may be arranged, each second connection member 3 is applied in a particular application scenario. The first connection member 2 serves as a connection medium between the second connection members 3 in the plurality of forms and the mounting member 1. Products having different applications may share a common set of molds of the first connection member 2, such that production costs are saved.

In order to adapt to various application scenarios, three embodiments are proposed for the connection structure between the second connection member 3 and the first connection member 2.

Figure 8:
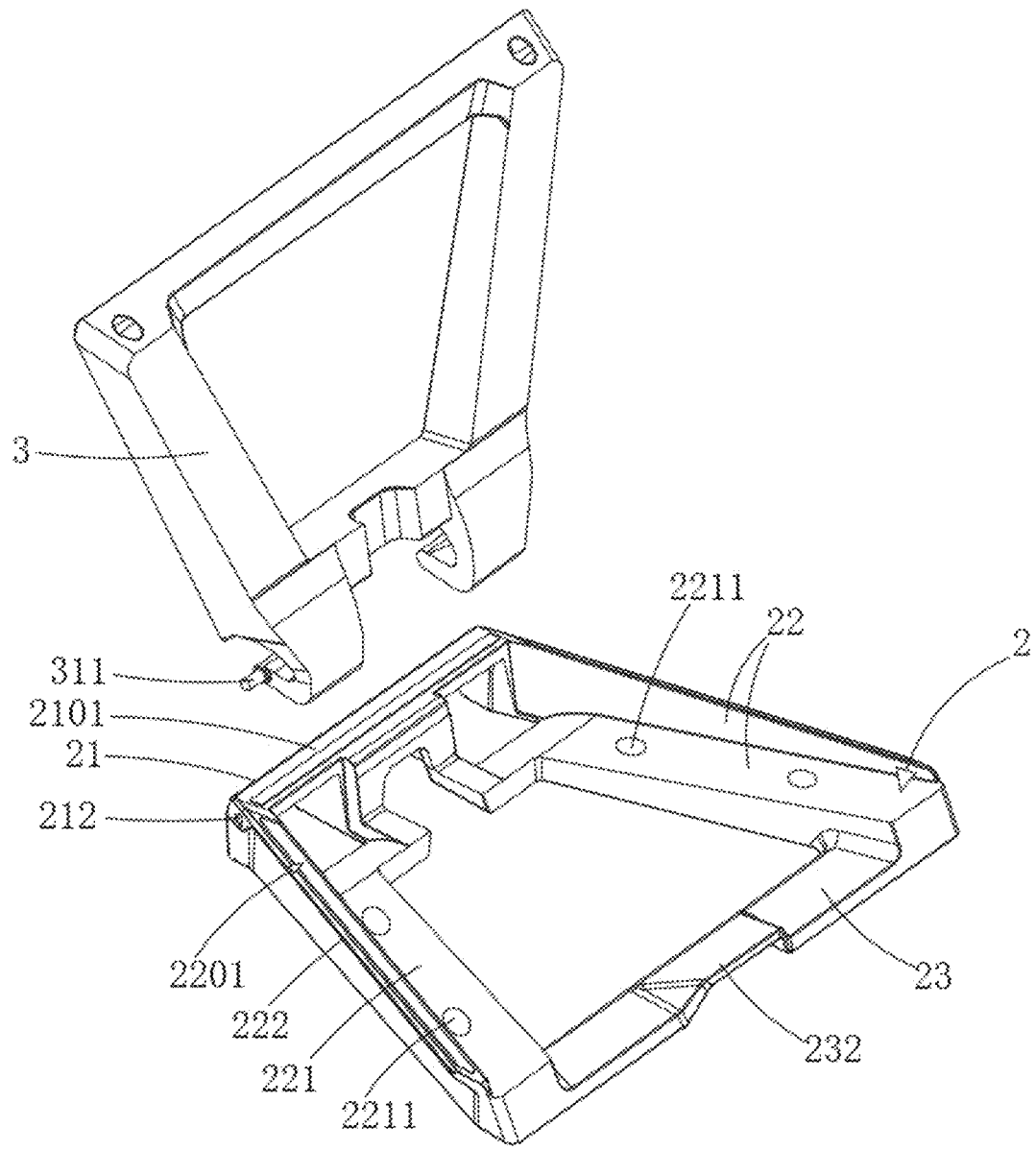
FIG. 8 is a structural schematic view of a connection structure of a first connection member and a second connection member according to an embodiment of the present disclosure.

In a first embodiment, as shown in FIG. 8, a shaft hole 212 is defined in the front abutting end 21, and a rotation shaft 311 extends through the second connection member 3. The rotation shaft 311 is inserted into the shaft hole 212, enabling the second connection member 3 to be hinged with the front abutting end 21. In the present embodiment, the second connection member 3 itself serves as the supporting object 5. The second connecting member 3 may be rotated to be stored or unfolded. The second connecting member 3 in this case is more suitable for scenarios where an angle or a position of the supported object 4 needs to be adjusted frequently.

In a second embodiment, as shown in FIG. 17, the second connection member 3 comprises a first connection portion 31 and a second connection portion 32. Each of the two lifting rods 221 defines the bolt hole 2211. The first connection portion 31 is fastened to the bolt holes 2211 of the two lifting rods 221 by bolts. The second connection portion 32 is disposed on a side of the first connection portion 31 away from the first connection member 2. The second connection portion 32 is connected to the supporting object 5. A structure of the second connection portion 32 is configured following a shape of the supporting object 5. The second connection portion 32 may be configured in a form of a sleeve in which the supporting object 5 is inserted.

In a third embodiment, the second connection member 3 comprises a first connection portion 31 and a second connection portion 32. The first connection portion 31 is welded to the first connection member 2, and the second connection portion 32 is disposed on a side of the first connection portion 31 away from the first connection member 2. The second connection portion 32 is connected with the supporting object 5. The structure of the second connection portion 32 is configured following a shape of the supporting object 5. The second connection portion 32 may be configured in a form of a column to be inserted into the supporting object 5.

Therefore, the first connection member 2 in which the front abutting end 21 defines the shaft hole 212 and the lifting rod 221 defines the bolt hole 2211, is served as the connection medium for a standard structure.

Of course, in other embodiments, the second connection member 3 may serve as the supporting object.

In addition, the present disclosure further provides another fast-detaching structure including the mounting member 1 and the first connection member 2.

In the present embodiment, the mounting member includes the bottom wall 11, the limiting wall 14, two positioning walls 12, and two fixation edges 13. The two positioning walls 12 are parallel to each other. The limiting wall 14 is connected between the two positioning walls 12. The bottom wall 11 is connected between the two positioning walls 12. The bottom wall 11 intersects with the limiting wall 14. The bottom wall 11, the limiting wall 14, and the two positioning walls 12 cooperatively define the mounting slot 10. The two fixation edges 13 are respectively disposed at top portions of the two positioning walls 12. The fixation edges 13 are extending toward the interior of the mounting slot 10. The bottom wall 11 defines the slot 110.

The first connection member 2 is detachably mounted in the mounting slot 10. The first connection member 2 includes the front abutting end 21, two abutting ends 22, and the deforming end 23. The front abutting end 21 is arranged corresponding to the limiting wall 14. The two abutting ends 22 are arranged corresponding to the two positioning walls 12. The deforming end 23 is disposed opposite to the front abutting end 21. Both the front abutting end 21 and the deforming end 23 are connected to the two abutting ends 22. The deforming end 23 may be elastically deformed. The deforming end 23 is arranged with the snapping tab 231 protruding toward the bottom wall 11. The deforming end 23 is further arranged with the drive portion 232, and the drive portion 232 is configured to drive the deforming end 23 to be elastically deformed.

When the first connection member 2 is mounted in the mounting slot 10, the front abutting end 21 abuts against the limiting wall 14, the two abutting ends 22 respectively abut against the two positioning walls 12, and the two abutting ends 22 also respectively abut against the two fixation edges 13, the deforming end 23 abuts against the bottom wall 11, and the snapping tab 231 is enabled to extend to be snapped into the slot 110.

In the present embodiment, the two positioning walls 12 are parallel to each other. The limiting wall 14 is configured to limit the first connection member 2 from moving forwardly. The two positioning walls 12 are configured to restrict the first connection member 2 from moving to only the left or backward. Other configurations of the present embodiment are the same as those in the above embodiments. The first connection member 2 in the present embodiment can also be fixed completely. Furthermore, the present embodiment is not shown in the accompanying drawings.

Figure 5:
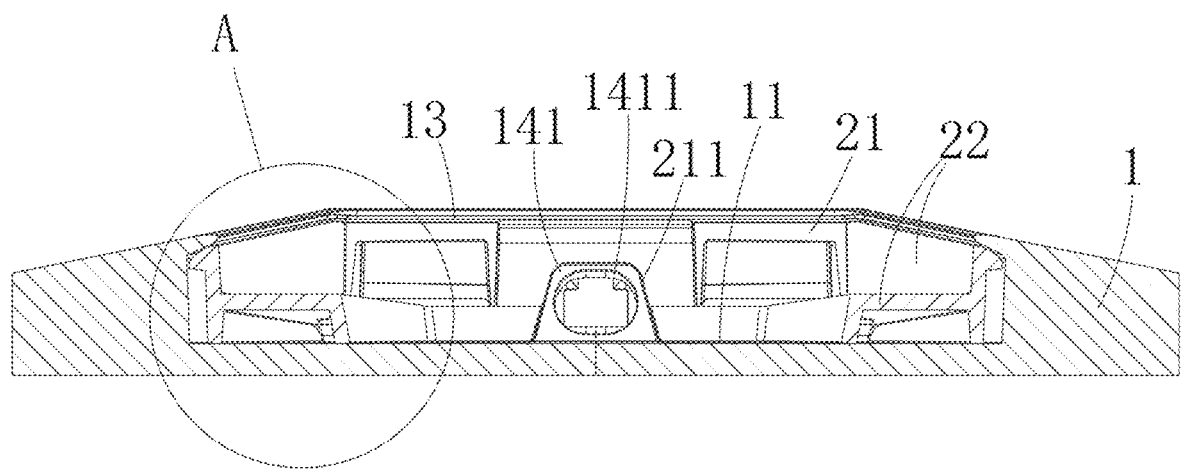
FIG. 5 is a cross-sectional view of an embodiment of the present disclosure.

It should be noted that, in order to describe the technical solution conveniently, directional terms such as "top", "bottom", "upward", "downward", "forward", "backward" and the like are all described based on the states shown in FIGS. 2 and 5. The terms are used to describe relative positional relationships between components. In practice of using the fast-detaching structure, the above direction terms may refer to opposite directions.

Obviously, the above-described embodiments are only a part of, not all of, the embodiments of the present disclosure. The accompanying drawings show preferred embodiments of the present disclosure and do not limit the scope of the present disclosure. The present disclosure may be achieved in various forms. These embodiments are provided for the purpose of understanding the present disclosure more thoroughly and comprehensively. Although the present disclosure has been described in detail with reference to the above embodiments, any ordinary skilled person in the art may modify the technical solutions in the above specific embodiments or make equivalent substitutions for some technical features therein. Any equivalent structure made based on the contents of the specification and the accompanying drawings of the present disclosure, applied directly or indirectly in other related technical fields, shall all be included in the scope of the present disclosure.

What is claimed is:

1. A fast-detaching structure, comprising:
a mounting member, comprising a bottom wall, two positioning walls, and two fixation edges; wherein, an angle is generated between the two positioning walls; the bottom wall is connected to the two positioning walls; the bottom wall and the two positioning walls cooperatively define a mounting slot; each of the two fixation edges is arranged on a top of a respective one of the two positioning walls; each fixation edge extends towards an inside of the mounting slot; the bottom wall defines at least one snapping slot;
a first connection member, detachably mounted in the mounting slot, wherein, the first connection member comprises two abutting ends and a deforming end; each of the two abutting ends is arranged corresponding to a respective one of the two positioning walls; the deforming end is connected to the two abutting ends; the deforming end is capable of being elastically deformed; at least one snapping tab is arranged on the deforming end and protruding towards the bottom wall; a drive portion is arranged on the deforming end and is configured to drive the deforming end to be elastically deformed;
wherein, when the first connection member is to be mounted in the mounting slot, each of the two abutting ends abuts against a respective one of the two positioning walls, an upper part of each of the two abutting ends abuts against a lower part of a respective one of the two fixation edges, the deforming end abuts against the bottom wall and enables the at least one snapping tab to extend to be snapped into the at least one snapping slot;
wherein deformation of the deforming end drives the at least one snapping tab to be snapped into or taken out of the at least one snapping slot along a direction of the deformation of the deforming end.

2. The fast-detaching structure according to claim 1, wherein, an avoidance space is formed between the drive portion and the bottom wall.

3. The fast-detaching structure according to claim 1, wherein, the number of the at least one snapping tab arranged on the deforming end is two; the two snapping tabs are disposed in a mirror symmetrical manner with respect to each other, taking the drive portion as a symmetrical center; the number of the at least one snapping slot in the bottom wall is two, and the two snapping slots correspond to the two snapping tabs.

4. The fast-detaching structure according to claim 1, wherein, each abutting end comprises a lifting rod and an abutting edge, the deforming end connects the lifting rod of one of the two abutting ends to the lifting rod of the other one of the two abutting ends; the abutting edge is disposed at a top of the lifting rod and extending towards the positioning wall; the two abutting edges abut against the two positioning walls respectively; and when the two abutting edges abut against the two positioning walls respectively, the two abutting edges abut against the two fixation edges respectively.

5. The fast-detaching structure according to claim 4, wherein, a bottom surface of each fixation edge is inclined, a side of the fixation edge near the respective positioning wall is lower than a side of the fixation edge away from the respective positioning wall; a top surface of the fixation edge has a configuration following a slope of the inclined bottom surface of the fixation edge.

6. The fast-detaching structure according to claim 4, wherein, the first connection member further comprises a front abutting end opposite to the deforming end, the front abutting end is connected to the lifting rods;
the mounting member is arranged with a limiting wall at an intersection of the two positioning walls; the bottom wall, the limiting wall, and the two positioning walls cooperatively define the mounting slot; and
when the first connection member is mounted in the mounting slot, the front abutting end abuts against the limiting wall.

7. The fast-detaching structure according to claim 1, wherein, the first connection member is ring shaped.

8. The fast-detaching structure according to claim 1, wherein, the first connection member is made of metal or plastic.

9. The fast-detaching structure according to claim 1, further comprising a second connection member, wherein, the second connection member is mounted on a side of the first connection member away from the mounting member; the second connection member serves as a supporting object or is configured to be connected to a supporting object.

10. The fast-detaching structure according to claim 9, wherein, the first connection member further comprises a front abutting end opposite to the deforming end; the front abutting end is connected to the two abutting ends; the front abutting end defines a shaft hole; the second connection member is arranged with a rotating shaft; the rotating shaft is inserted into the shaft hole to enable the second connection member to be hinged with the front abutting end; the second connection member is configured to support the first connection member.

11. The fast-detaching structure according to claim 9, wherein, the second connection member comprises a first connection portion and a second connection portion connected to the first connection portion; each of the two abutting ends defines a bolt hole; the first connection portion is fastened to each bolt hole by a respective bolt; the second connection portion is disposed on a side of the first connection portion away from the first connection member; and the second connection portion is configured to be connected with the supporting object.

12. The fast-detaching structure according to claim 9, wherein, the second connection member comprises a first connection portion and a second connection portion connected to the first connection portion; the first connection portion is welded to the first connection member; the second connection portion is disposed on a side of the first connection portion away from the first connection member; the second connection portion is configured to be connected to the supporting object.

13. The fast-detaching structure according to claim 9, wherein, the second connection member and the first connection member are made of a same material.

14. A fast-detaching structure, comprising:
a mounting member, comprising a bottom wall, two positioning walls, and two fixation edges; wherein, an angle is generated between the two positioning walls; the bottom wall is connected to the two positioning walls; the bottom wall and the two positioning walls cooperatively define a mounting slot; each of the two fixation edges is arranged on a top of a respective one of the two positioning walls; each fixation edge extends towards an inside of the mounting slot; the bottom wall defines at least one snapping slot;
a first connection member, detachably mounted in the mounting slot, wherein, the first connection member comprises two abutting ends and a deforming end; each of the two abutting ends is arranged corresponding to a respective one of the two positioning walls; the deforming end is connected to the two abutting ends; the deforming end is capable of being elastically deformed; at least one snapping tab is arranged on the deforming end and protruding towards the bottom wall; a drive portion is arranged on the deforming end and is configured to drive the deforming end to be elastically deformed;
wherein, when the first connection member is to be mounted in the mounting slot, each of the two abutting ends abuts against a respective one of the two positioning walls, an upper part of each of the two abutting ends abuts against a lower part of a respective one of the two fixation edges, the deforming end abuts against the bottom wall and enables the at least one snapping tab to extend to be snapped into the at least one snapping slot;
wherein the mounting member is arranged with a limiting wall at an intersection of the two positioning walls;
wherein, the limiting wall is arranged with a connection post protruding towards the inside of the mounting slot; the connection post defines a wire channel that extends through the connection post; the wire channel is configured to enable a wire to pass through; the first connection member further comprises a front abutting end opposite to the deforming end; the front abutting end defines a receiving port, and the connection post extends through the receiving port.

15. The fast-detaching structure according to claim 14, wherein, the two fixation edges extend to reach a top of the limiting wall and are connected to each other.

16. The fast-detaching structure according to claim 14, wherein, a side of the mounting slot away from the limiting wall extends through the mounting member.

17. A fast-detaching structure, comprising:
a mounting member, comprising a bottom wall, two positioning walls, and two fixation edges; wherein, an angle is generated between the two positioning walls; the bottom wall is connected to the two positioning walls; the bottom wall and the two positioning walls cooperatively define a mounting slot; each of the two fixation edges is arranged on a top of a respective one of the two positioning walls; each fixation edge extends towards an inside of the mounting slot; the bottom wall defines at least one snapping slot;
a first connection member, detachably mounted in the mounting slot, wherein, the first connection member comprises two abutting ends and a deforming end; each of the two abutting ends is arranged corresponding to a respective one of the two positioning walls; the deforming end is connected to the two abutting ends; the deforming end is capable of being elastically deformed; at least one snapping tab is arranged on the deforming end and protruding towards the bottom wall; a drive portion is arranged on the deforming end and is configured to drive the deforming end to be elastically deformed;
wherein, when the first connection member is to be mounted in the mounting slot, each of the two abutting ends abuts against a respective one of the two positioning walls, an upper part of each of the two abutting ends abuts against a lower part of a respective one of the two fixation edges, the deforming end abuts against the bottom wall and enables the at least one snapping tab to extend to be snapped into the at least one snapping slot;
wherein, the deforming end comprises a fixation plate and a deforming plate that are disposed side by side; the fixation plate and the deforming plate are both connected to each abutting end; the fixation plate defines a fastening slot, the fastening slot extends in depth along a direction extending from the fixation plate toward the deforming plate; the at least one snapping tab is disposed at a bottom surface of the deforming plate; the drive portion is disposed at a top surface of the deforming plate; the top surface of the deforming plate is further arranged with a fastening tab corresponding to the at least one snapping tab; the fastening tab is disposed corresponding to a location of the fastening slot;
the fast-detaching structure further comprises a fastener, the fastener extends through the fastening tab, and the fastener is enabled to extend into the fastening slot.

18. The fast-detaching structure according to claim 17, wherein, the fixation plate is arranged with a protruding reinforcement portion at a position corresponding to the drive portion; a shielding space is formed between the reinforcement portion and the bottom wall; the reinforcement portion is arranged with a reinforcement rib inside the shielding space; the reinforcement rib is extending along a length direction of the fixation plate.

19. The fast-detaching structure according to claim 17, wherein, the fixation plate and the deforming plate are made of a same material, and a thickness of the fixation plate is greater than a thickness of the deforming plate.

* * * * *